US007474200B2

(12) United States Patent
Ogino et al.

(10) Patent No.: US 7,474,200 B2
(45) Date of Patent: Jan. 6, 2009

(54) VEHICLE DEVICE CONTROL SYSTEM, VEHICLE-SIDE UNIT AND PORTABLE DEVICE

(75) Inventors: Kenichi Ogino, Toyota (JP); Ifushi Shimonomoto, Okazaki (JP)

(73) Assignee: Denso Corporation (JP)

( * ) Notice: Subject to any disclaimer, the term of this patent is extended or adjusted under 35 U.S.C. 154(b) by 323 days.

(21) Appl. No.: 11/520,010

(22) Filed: Sep. 13, 2006

(65) Prior Publication Data
US 2007/0057765 A1 Mar. 15, 2007

(30) Foreign Application Priority Data
Sep. 13, 2005 (JP) .............................. 2005-265725

(51) Int. Cl.
B60R 25/10 (2006.01)
G06F 17/00 (2006.01)
(52) U.S. Cl. ............................ 340/426.16; 340/426.13; 340/426.28; 340/5.61; 340/5.72; 340/426.36; 701/2; 701/49
(58) Field of Classification Search ............ 340/426.16, 340/426.13, 426.28, 426.29, 426.36, 5.72, 340/5.61, 5.7, 5.2, 825.72; 307/10.1, 10.2, 307/9.1; 701/2, 49
See application file for complete search history.

(56) References Cited
U.S. PATENT DOCUMENTS
5,929,769 A 7/1999 Garnault ................ 340/825.31

| | | | |
|---|---|---|---|
| 6,218,932 B1 | 4/2001 | Stippler | 340/426.1 |
| 6,476,517 B1* | 11/2002 | Okada | 307/10.2 |
| 6,714,119 B1 | 3/2004 | Mindl et al. | 340/5.72 |
| 6,873,248 B2* | 3/2005 | Ott | 340/5.72 |
| 6,924,735 B2* | 8/2005 | Ueda et al. | 340/426.28 |
| 2006/0082436 A1 | 4/2006 | Kamiya et al. | 340/5.72 |
| 2006/0279402 A1* | 12/2006 | Okamitsu et al. | 340/5.62 |
| 2007/0205863 A1 | 9/2007 | Eberhard | 340/5.72 |
| 2008/0197987 A1* | 8/2008 | King et al. | 340/426.36 |

FOREIGN PATENT DOCUMENTS
JP 2000-104429 4/2000
JP 2001-295524 10/2001

OTHER PUBLICATIONS
German Office Action dated Mar. 18, 2008 issued in counterpart German Application 10 2006 042 682.7-51 with English translation.

* cited by examiner

Primary Examiner—Toan N Pham
(74) Attorney, Agent, or Firm—Nixon & Vanderhye PC (57) ABSTRACT

On condition that a holder of a portable device has manipulated an ignition switch, a main control ECU discriminates the open/closed state of a luggage compartment door. When the luggage compartment door is in the closed state, the main control ECU instructs a rear transmitter to transmit a first request signal. When the luggage compartment door is in the open state, the main control ECU instructs the rear transmitter to transmit a second request signal. A portable ECU discriminates the request signal received by a receiver. When the received request signal has been determined to be the second request signal, the portable ECU adjusts the transmission output of a response signal which is to be transmitted from a transmitter, to a second transmission output which is lower than an ordinary output.

8 Claims, 6 Drawing Sheets

VEHICLE DEVICE CONTROL SYSTEM, VEHICLE-SIDE UNIT AND PORTABLE DEVICE

CROSS REFERENCE TO RELATED APPLICATION

This application is based on and incorporates herein by reference Japanese Patent Application No. 2005-265725 filed on Sep. 13, 2005.

FIELD OF THE INVENTION

The present invention relates to a vehicle device control system, wherein the operations of vehicle devices are controlled by mutual communications between a vehicle-side unit and a portable device, and also relates to the vehicle-side unit as well as the portable device.

BACKGROUND OF THE INVENTION

Heretofore, as a vehicle device control system, there has been known, as disclosed in JP2000-104429A, a system that controls changeovers of locked/unlocked states of individual doors on the basis of a collated result of an ID code based on mutual radio communications between a portable electronic key (portable device) and a vehicle-side unit. Besides, in a case where a holder of the portable device is inside a vehicle compartment, a release of steering lock and a start of an engine are permitted.

The vehicle-side unit is configured by outside transmitters, an inside transmitter, and a rear transmitter inside a luggage compartment, which transmit request signals to the portable device, a receiver which receives a response signal from the portable device, and a main control ECU which controls vehicle devices such as the doors, on the basis of the results of transmissions and receptions to and from the portable device. The outside transmitters, the inside transmitter and the rear transmitter have communication areas in which they are capable of the mutual communications with the portable device, in predetermined ranges around a vehicle, inside the vehicle compartment and inside the luggage compartment, respectively. Thus, it is possible to sense that a holder of the portable device approaches the vehicle, or that the holder gets on or off the vehicle.

In a case, for example, where the holder of the portable device has approached the vehicle in order to get on the vehicle and where he/she has entered the communication area of the outside transmitter, the portable device transmits the response signal containing its ID code, to the vehicle-side unit in response to a request signal. Upon determining that the ID code acquired from the portable device satisfies a predetermined relation such as the agreement thereof with a registered ID code, the vehicle-side unit gives a door lock controller being the vehicle device, a control signal so as to unlock the corresponding door. When the holder of the portable device has gotten on the vehicle, the communication area of the outside transmitter with the portable device shifts from outside the vehicle into the vehicle compartment. Then, the vehicle-side unit releases the steering lock and permits the start of the engine as the controls of the vehicle devices, on the basis of the collated result of the ID code.

Meanwhile, the communication area of the rear transmitter is sometimes expanded so as to cover a partial region inside the vehicle compartment, whereby the vehicle-side unit can perform the mutual communications with the portable device, in the whole region inside the vehicle compartment by the inside transmitter and the rear transmitter. In this case, when the collation of the ID code has proceeded favorably by the mutual communications between the rear transmitter and the portable device, the main control ECU performs the controls so as to release the steering lock and to permit the engine start.

In addition, it is sometimes desired to use the vehicle in a state where the portable device and a bag or the like baggage put into the luggage compartment are collected, and where the portable device is placed in the luggage compartment. Also in this case, as in the above case, the steering lock is released and the engine start is permitted when the collation of the ID code has proceeded favorably by the mutual communications between the rear transmitter and the portable device.

It is problematic, however, to simply permit the engine start on the basis of the collated result of the ID code based on the mutual communications between the luggage-compartment transmitter and the portable device. More specifically, when the luggage compartment door is brought into its open state, the shield of electric waves is removed, and the communication area based on the rear transmitter is expanded outside the vehicle. As a result, even when the portable device exists outside the vehicle, the start of the engine is possible. Then, in a case, for example, where the authorized holder of the portable device is performing a loading or unloading operation with the luggage compartment door opened, the engine might be started by a third party, and the security of the vehicle is apprehended.

SUMMARY OF THE INVENTION

An object of the present invention is to provide a vehicle device control system, a vehicle-side unit and a portable device, which can enhance the security of a vehicle.

In one aspect of the invention, when a portable device has received a second request signal transmitted from a vehicle-side unit in the open state of a luggage compartment, it adjusts the transmission output of a response signal so as to become lower than in case of the reception of a first request signal. Thus, even when a luggage compartment door is in its open state, a communication area is not expanded outside a vehicle, and mutual communications outside the vehicle become impossible. Accordingly, in a case, for example, where the authorized owner of the portable device is performing a loading or unloading operation with the luggage compartment opened, a third party can be prevented from starting an engine, and the security of the vehicle can be enhanced.

Besides, in another aspect of the invention, a vehicle-side unit adjusts the transmission output of a request signal which is to be transmitted from the transmitter of the vehicle-side unit in correspondence with the open/closed state of a luggage compartment door, so as to become lower than an ordinary output. Thus, an advantage similar to the above can be attained. Moreover, since the same portable device as in the prior art can be used, curtailment in cost can be achieved as the whole system.

Further, in still another aspect of the invention, the reception sensitivity of a response signal in a portable device is adjusted in correspondence with the open/closed state of a luggage compartment door. That is, the reception sensitivity in the open state of the luggage compartment door is made lower than the reception sensitivity in the closed state of the luggage compartment door. Thus, even when the luggage compartment door is in the open state, the communication area between a vehicle-side unit and the portable device can be prevented from being expanded outside a vehicle.

DETAILED DESCRIPTION OF THE EMBODIMENTS

First Embodiment

Figure 1:
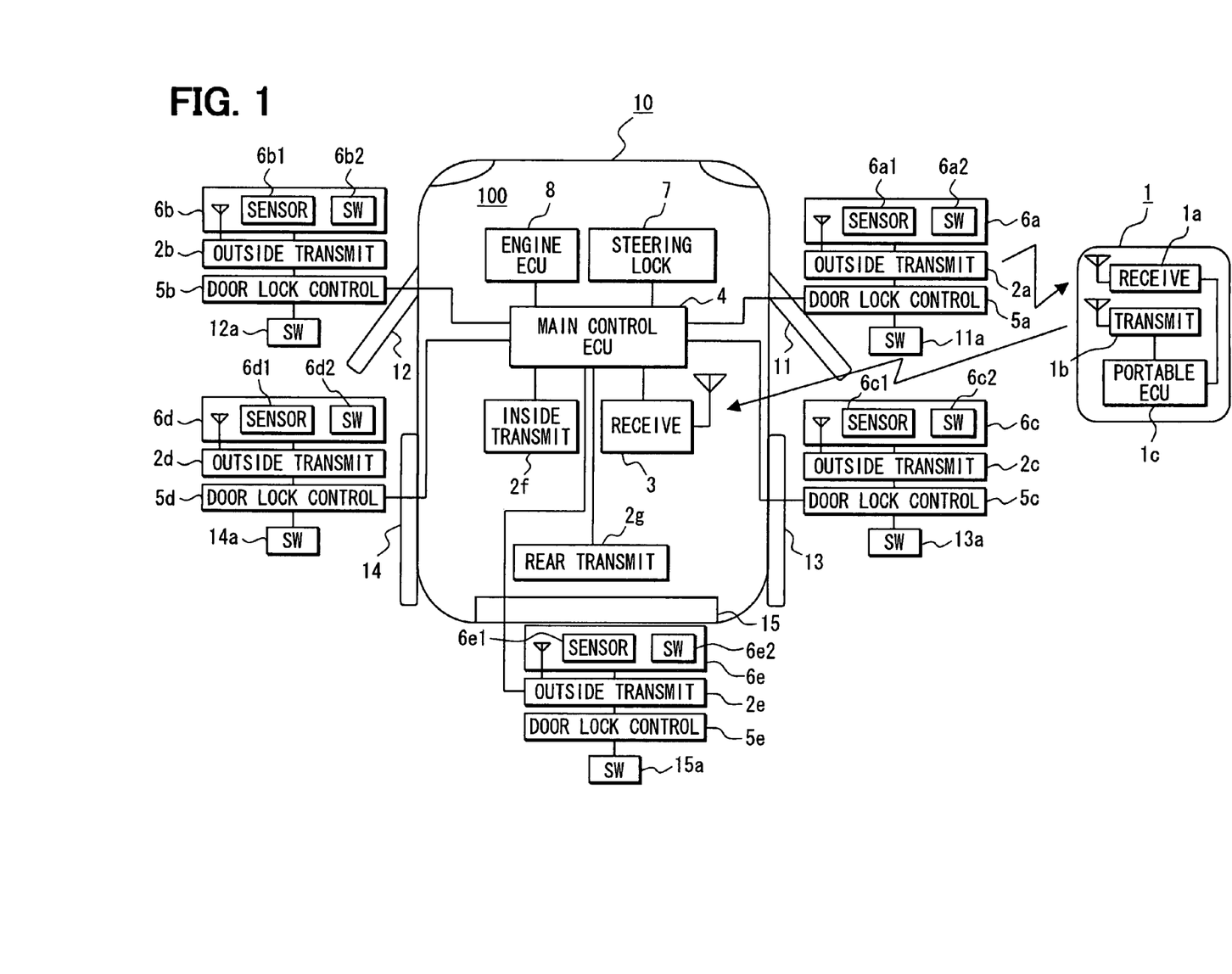
FIG. 1 is a schematic block diagram showing a vehicle device control system in a first embodiment.

As shown in FIG. 1, a vehicle device control system is such that a main control ECU 4 which is included in a vehicle-side unit 100 disposed in a vehicle 10 performs the controls of vehicle devices, such as the controls of the locked/unlocked states of individual doors 11-15, the control of a steering lock state, and the permission/prohibition of engine start, on the basis of the collated result of an ID code based on the mutual communications between a portable device (electronic key) 1 and the vehicle-side unit 100.

The vehicle-side unit 100 includes outside transmitters 2a-2e which are respectively disposed in the doors for getting on and off, 11-14 leading into a vehicle compartment and in the luggage compartment door (rear door) 15 leading into a luggage compartment, the doors being included in the vehicle 10, an inside transmitter 2f which is disposed inside the vehicle compartment, and a rear transmitter 2g which is disposed inside a luggage compartment. The outside transmitters 2a-2e, the inside transmitter 2f, and the luggage-compartment transmitter (rear transmitter) 2g inside the luggage compartment transmits request signals on the basis of transmission instruction signals from the main control ECU 4.

Each of the outside transmitters 2a-2e and the inside transmitter 2f among the transmitters transmits a first request signal as the request signal. Besides, the rear transmitter 2g can selectively transmit the two sorts of signals of the first request signal and a second request signal, and the first and second request signals are changed-over on the basis of the transmission instruction signal from the main control ECU 4 functioning as instruction means.

Communication areas in which mutual communications with the portable device 1 are permitted by the outside transmitters 2a-2e are respectively formed around the individual doors 11-15, and a communication area in which mutual communications with the portable device 1 are permitted by the inside transmitter 2f is formed inside the vehicle compartment.

In addition, a communication area in which mutual communications with the portable device 1 are permitted by the rear transmitter 2g is formed in the luggage compartment. The communication area set by the rear transmitter 2g is sometimes expanded so as to cover, not only the luggage compartment, but also a partial region inside the vehicle compartment. In such a case, accordingly, the whole inside of the vehicle compartment is covered as the communication area by the inside transmitter 2f and the rear transmitter 2g. This comes from the fact that the vehicle-compartment communication area set by the inside transmitter 2f cannot cover the whole inside of the vehicle compartment in some cases, so the non-covered region of the inside needs to be compensated by the rear transmitter 2g.

Besides, the vehicle-side unit 100 includes a receiver 3 which is disposed inside the vehicle compartment or the luggage compartment of the vehicle 10, and which is brought into a state capable of receiving a response signal in synchronism with the output of the transmission instruction signal for any of the transmitters 2a-2g, so as to receive the response signal transmitted from the portable device 1. The response signal received by the receiver 3 is outputted to the main control ECU 4, and the main control ECU 4 determines whether the control of the locked/unlocked state of the door, or the like is to be performed, on the basis of the collated result of the ID code contained in the received response signal.

Further, the vehicle-side unit 100 includes door lock controllers 5a-5e, which are disposed in the respective doors 11-15 of the vehicle 10, and which subject the respective doors 11-15 to lock/unlock controls. The door lock controllers 5a-5e operate in accordance with instruction signals from the main control ECU 4.

The door handles 6a-6e of the doors 11-15 of the vehicle 10 are respectively provided with touch sensors 6a1-6e1, each of which can detect that the holder of the portable device 1 has touched the corresponding one of the door handles 6a-6e to perform an unlocking manipulation for the corresponding door handle. In a case where the unlocking manipulation for any of the door handles 6a-6e is detected, the corresponding one of the doors 11-15 is unlocked. Besides, the door handles 6a-6e are respectively provided with door lock switches 6a2-6e2 each of which is configured as a push switch. When any of the door lock switches 6a2-6e2 is manipulated, the corresponding one of the doors 11-15 can be locked. Incidentally, the door handles 6a-6e function also as the antennas of the outside transmitters 2a-2e stated above, respectively.

In addition, the doors 11-15 include door courtesy lamp switches 11a-15a for detecting open/closed states, respectively. The respective switches 11a-15a transmit to the main control ECU 4 detection signals, which differ from each other in accordance with the open states and closed states of the corresponding doors. The main control ECU 4 receives the detection signals of the door courtesy lamp switches 11a-15a, and functions as determination means for determining the open/closed states of the respective doors 11-15.

On the other hand, the portable device 1 includes a receiver 1a which receives the request signal from any of the outside transmitters 2a-2e, the inside transmitter 2f or the rear transmitter 2g, a transmitter 1b which transmits the response signal containing the ID code, etc., in response to the reception of the request signal, and a portable ECU 1c which is connected with the above receiver 1a and transmitter 1b and which executes various control processes.

The portable ECU 1c determines the presence or absence of the reception of the request signal on the basis of the reception signal of the receiver 1a, and it generates the response signal containing the ID code, etc., in response to the request signal, so as to transmit the generated response signal from the transmitter 1b. Besides, the portable ECU 1c functions as output adjustment means for adjusting the transmission output of the transmitter 1b in correspondence with the sort of the received request signal. As the function of the output adjustment means, when the first request signal has been received by the receiver 1a, the transmission output of the response signal to be transmitted from the transmitter 1b is adjusted to a first transmission output. When the second request signal has been received, the transmission output is adjusted to a second transmission output which is lower than the first transmission output.

Here, the first transmission output is set at such a transmission output that, when the portable device 1 is within the outside communication area set by any of the outside transmitters 2a-2e, the receiver 3 can receive the response signal from the portable device 1. Besides, the second transmission output is set at such a transmission output that, when the portable device 1 is in the luggage compartment or the vehicle compartment, the receiver 3 can receive the response signal from the portable device 1.

In order to enhance the security of the vehicle 10, the vehicle device control system according to this embodiment includes a steering lock ECU 7 and an engine ECU 8. Also the steering lock ECU 7 or the engine ECU 8 turns ON/OFF steering lock or changeover-controls the permission/prohibition of the engine start, on the basis of the instruction signal from the main control ECU 4. Processing based on the steering lock ECU 7 and the engine ECU 8 will be described below.

In a case where the holder of the portable device 1 has gotten on the vehicle 10 by manipulating any of the doors 11-14 and where he/she has manipulated an ignition switch disposed in the vehicle 10, the main control ECU 4 collates the ID code in such a way that mutual communications are performed with the portable device 1 by using the inside transmitter 2f, rear transmitter 2g and receiver 3 which are disposed inside the vehicle compartment. On the other hand, the steering lock ECU 7 inquires of the main control ECU 4 as to if the steering lock may be released. In a case where the collated result of the ID code is "OK", the main control ECU 4 gives the steering lock ECU 7 the response of permitting the release of the steering lock. The steering lock ECU 7 releases the steering lock on the basis of the response. In this way, the steering lock state of the steering wheel of the vehicle 10 is controlled. Further, on this occasion, the main control ECU 4 simultaneously outputs an instruction signal to the engine ECU 8 so as to permit the start of the engine of the vehicle 10.

In this manner, when the mutual communications between the rear transmitter 2g and the portable device 1 and the collation of the ID code have proceeded favorably, the release of the steering lock and the start of the engine are permitted. Thus, the vehicle 10 is permitted to be used in a state where the portable device 1 and a bag or the like baggage put in the luggage compartment are collected and where the portable device 1 is placed in the luggage compartment, so that the convenience of the holder of the portable device 1 can be enhanced.

Figure 2:
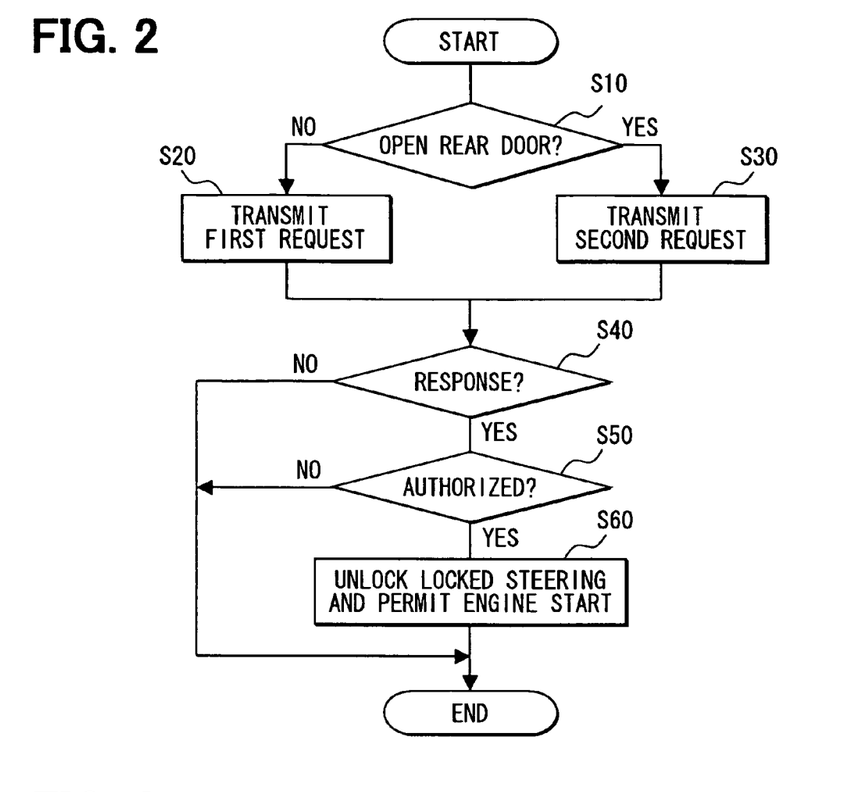
FIG. 2 is a flow chart showing the processing of a vehicle-side unit for performing a door unlock control and an engine start permission control.

Processing shown in FIG. 2 is executed by the main control ECU 4 on condition that the holder of the portable device 1 has gotten on the vehicle 10, and that he/she has manipulated an ignition switch disposed in the vehicle 10.

The main control ECU 4 determines the open or closed state of the luggage compartment door (back door) 15 on the basis of the detection signal from the door courtesy lamp switch 15a. Here, when the luggage compartment door 15 is in the closed state ("No" at step S10), the first request signals are transmitted from the inside transmitter 2f and the rear transmitter 2g (step S20), and the reception of the response signal from the portable device 1 is waited. When the response signal has been received by the receiver 3 ("Yes" at step S40), the ID code contained in this response signal is collated (compared) with a registered ID code. If the collation is "OK" (the portable device is authorized) ("Yes" at step S50), the release of the steering lock and the start of the engine are permitted (step S60).

On the other hand, when the luggage compartment door 15 is in the open state ("Yes" at step S10), the first request signal is transmitted from the inside transmitter 2f, but the second request signal is transmitted from the rear transmitter 2g (step S30), and the reception of the response signal from the portable device 1 is waited. When the response signal has been received by the receiver 3 ("Yes" at step S40), the ID code contained in the response signal is collated with the registered ID code. If the collation is "OK" ("Yes" at step S50), the release of the steering lock and the start of the engine are permitted (step S60).

Conversely, in a case where the response signal has not been received by the receiver 3 ("No" at step S40), or in a case where the collation between the ID code and the registered ID code has resulted in the determination of "NG (no good)" though the response signal has been received ("No" at step S50), the processing is executed again without permitting either of the release of the steering lock and the start of the engine.

Figure 3:
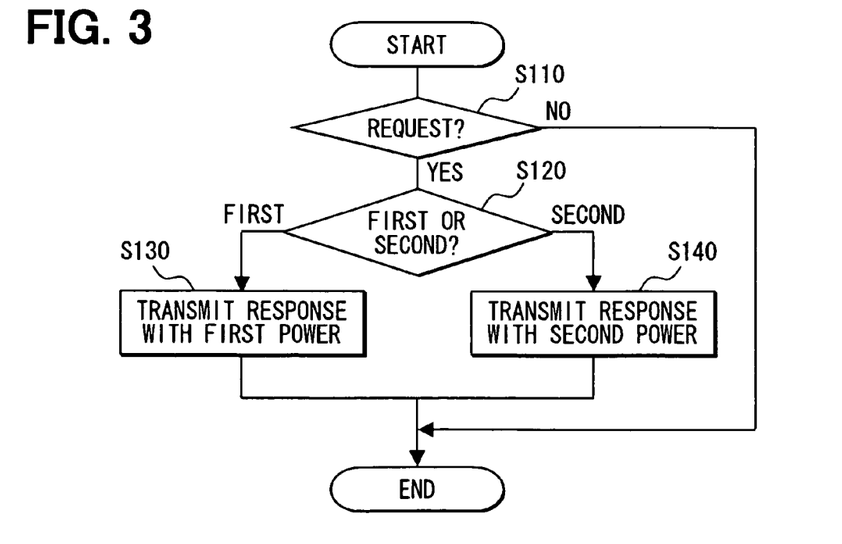
FIG. 3 is a flow chart showing the processing of a portable device during the mutual communications thereof with the vehicle-side unit.

In the portable device 1, the receiver 1a determines whether the request signal has been received. In a case where the request signal has been received, the portable ECU 1c discriminates the sort of the request signal. Besides, the portable ECU 1c adjusts the transmission output of the response signal which is to be transmitted from the transmitter 1b, in correspondence with the sort of the received request signal.

As shown in FIG. 3, whether the request signal from any of the transmitters 2a-2g has been received by the receiver 1a is determined (step S110). When the request signal has been received ("Yes" at step S110), the portable ECU 1c discriminates the sort of the request signal received by the receiver 1a, that is, either the first request signal or the second request signal (step S120).

Here, when the received request signal is discriminated to be the first request signal (step S120), the portable ECU 1c adjusts the transmission output of the response signal which is to be transmitted from the transmitter 1b, to the first transmission output, and it gives the instruction of the transmission (step S130). On the other hand, when the received request signal is discriminated to be the second request signal (step S120), the portable ECU 1c adjusts the transmission output of the response signal which is to be transmitted from the transmitter 1b, to the second transmission output, and it gives the instruction of the transmission (step S140).

Figure 4:
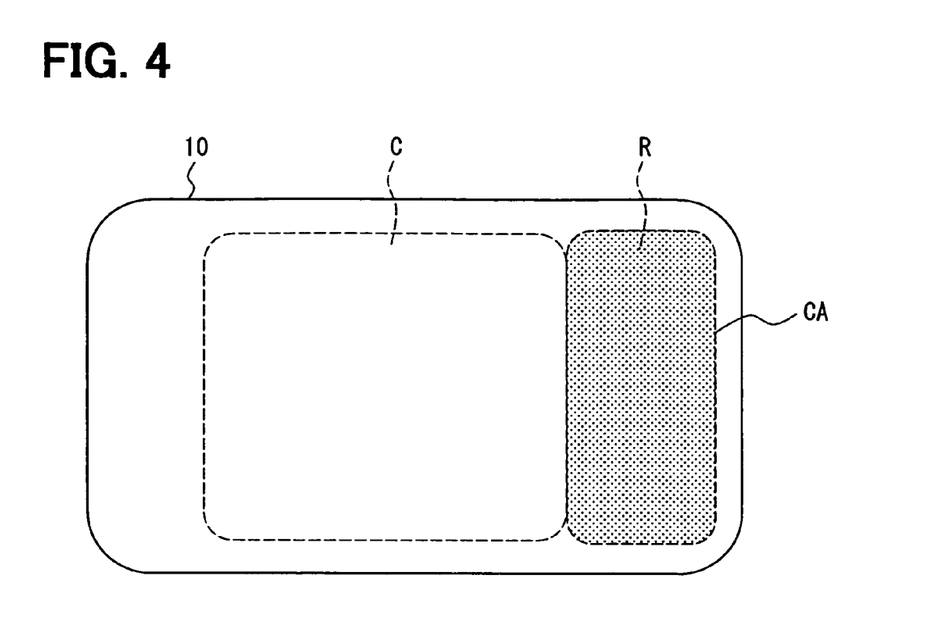
FIG. 4 is a schematic view showing a luggage-compartment communication area at the time when a luggage compartment door has been opened.

Accordingly, in a case where the mutual communications are performed between the portable device 1 and the rear transmitter 2g under the open state of the luggage compartment door 15, the transmission output of the response signal which is to be transmitted from the transmitter 1b of the portable device 1 is set at the second transmission output which is lower than the first transmission output. Thus, as shown in FIG. 4, the communication area CA between the rear transmitter 2g and the portable device 1 is limited within the luggage compartment R behind the vehicle compartment C without being expanded outside the vehicle 10.

Figure 5:
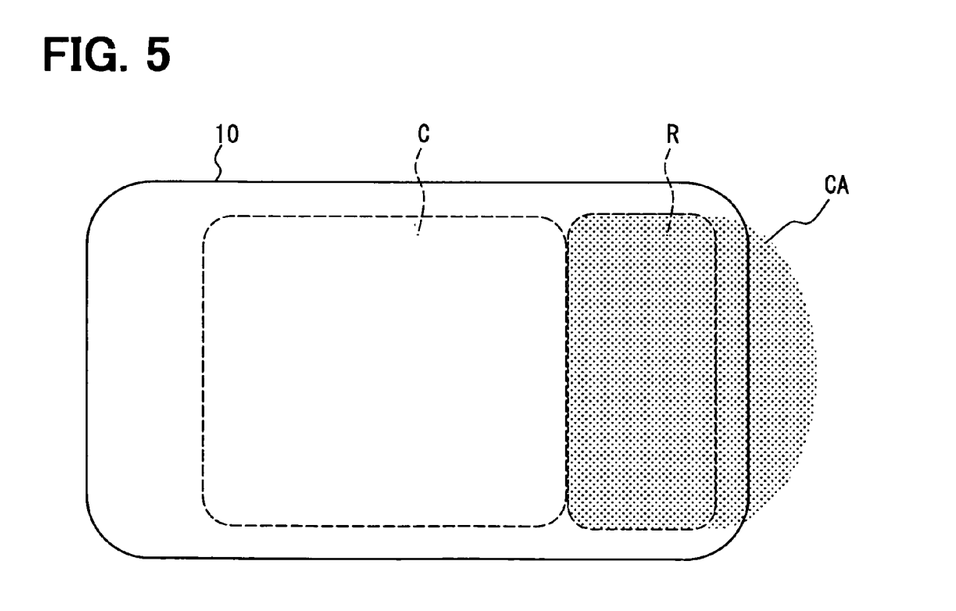
FIG. 5 is a schematic view showing a luggage-compartment communication area at the time when the luggage compartment door has been opened.

Without the transmission output control, the shield of the request signal which is transmitted from the rear transmitter 2g is removed in a case where the transmission output of the transmitter 1b of the portable device 1 is set at the first transmission output in spite of the open state of the door 15. As a result, as shown in FIG. 5, the communication area CA based on the rear transmitter 2g is expanded outside the vehicle 10 still behind the luggage compartment R. Accordingly, even when the holder of the portable device 1 stays outside the vehicle, the mutual communications between the vehicle-side unit and the portable device 1 are established. Then, even when the portable device 1 is outside the vehicle, the release of the steering lock and the start of the engine are sometimes permitted. By way of example, when the authorized holder of the portable device 1 is performing a loading operation into the luggage compartment R or an unloading operation from the luggage compartment R, a third party can start the engine.

In this embodiment, when the luggage compartment door 15 is in the open state, the transmission output of the response signal which is to be transmitted from the portable device 1 is lowered, and the communication area based on the rear transmitter 2g is confined within the luggage compartment without regard to the opening/closure of the luggage compartment door 15. Thus, the communication area is prevented from being expanded outside the vehicle, whereby the security of the vehicle can be enhanced.

Second Embodiment

In a second embodiment, the main control ECU 4 has the output adjustment function of adjusting the transmission output of a request signal which is to be transmitted from the rear transmitter 2g.

Figure 6:
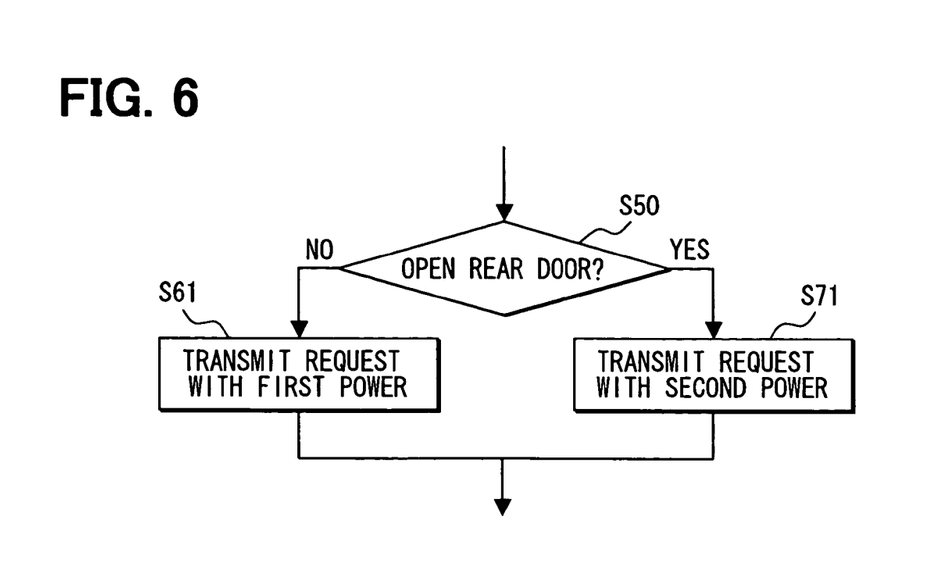
FIG. 6 is a flow chart showing the processing of a vehicle-side unit in a second embodiment.

Specifically, the processing steps of step S61 and step S71 shown in FIG. 6 are respectively executed instead of the processing steps of step S20 and step S30 of the flow chart shown in FIG. 2. When the door 15 is in its closed state, the main control ECU 4 adjusts the transmission output of the request signal which is to be transmitted from the rear transmitter 2g, to a first transmission output, and it gives the instruction of transmitting the request signal (step S61). On the other hand, when the door 15 is in its open state, the main control ECU 4 adjusts the transmission output of the request signal which is to be transmitted from the rear transmitter 2g, to a second transmission output which is lower than the first transmission output, and it gives the instruction of transmitting the request signal (step S71).

Here, the first transmission output is set at a transmission output at which the portable device 1 can receive the request signal when it lies within the communication area set by any of the individual transmitters 2a-2g, whereas the second transmission output is set to a transmission output at which, in the mutual communications of the portable device 1 with the rear transmitter 2g, the portable device 1 can receive the request signal from the rear transmitter 2g only when it lies inside the luggage compartment.

Figure 7:
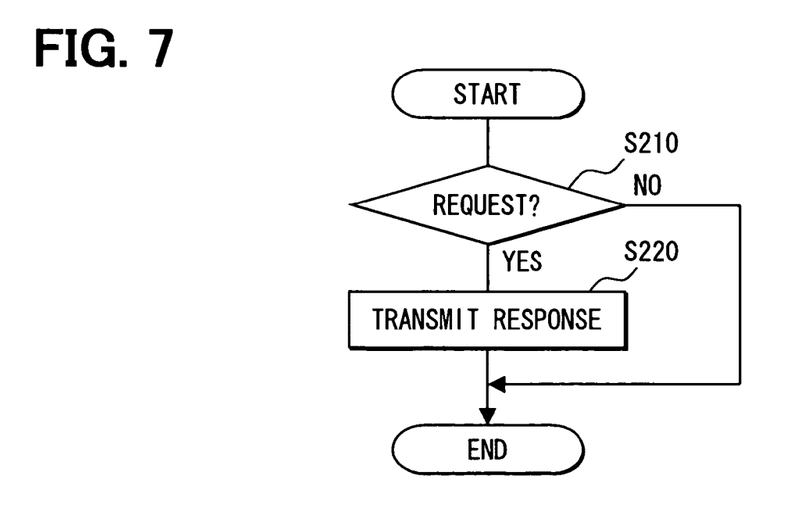
FIG. 7 is a flow chart showing the processing of a portable device in the second embodiment.

Besides, the processing of the portable device 1 is made as shown in FIG. 7. The portable ECU 1c determines whether the request signal has been received by the receiver 1a. When the request signal has been received ("Yes" at step S210), the portable ECU 1c causes the transmitter 1b to transmit a response signal (step S220). Here, the transmission output of the response signal which is transmitted from the transmitter 1b is set at the first transmission output stated in the first embodiment.

Third Embodiment

In a third embodiment, the reception sensitivity of the receiver 1a is adjusted in correspondence with the open/closed state of the luggage compartment door 15. There will be first described a communication procedure in the mutual communications between any of the transmitters 2a-2g and the portable device 1. Here, a case where the portable device 1 communicates with the rear transmitter 2g will be exemplified in the ensuing description.

Before the communications are started, the portable device 1 is in a sleep state. Therefore, the rear transmitter 2g transmits an activation request signal for causing the portable device 1 to wake up. The portable device 1 wakes up by the activation request signal, and returns a first acknowledgement signal (ACK signal). When the receiver 3 has received the first ACK signal, the outside transmitter 2g transmits a first return request signal which contains a vehicle ID code differing from vehicle to vehicle, and which makes a request for the return of a second ACK (acknowledge) signal, in a case where the portable device 1 has the same vehicle ID code. Upon receiving the first transmission request signal, the portable device 1 returns a second ACK signal in a case where it has the same vehicle ID code as the vehicle ID code contained in the first transmission request signal.

When the receiver 3 has received the second ACK signal, the rear transmitter 2g transmits a second transmission request signal which contains a code differing every transmitter, and which makes a request for the transmission of an ID code. The portable device 1 creates a response code by utilizing the code contained in the second transmission request signal, and it transmits a response signal which contains the response code and the ID code. In a case where the first and second ACK signals are not returned from the portable device 1 when the outside transmitter 2g has transmitted the activation request signal and the first transmission request signal, the portable device 1 is regarded as being nonexistent within the communication area, and the communications are ended.

As stated above, the response code is created by utilizing the code differing from transmitter to transmitter. The main control ECU 4 can therefore grasp from the response code, the specified transmitter whose signal has been responded to by the response signal of the portable device 1. In the above communication processing, the first and second transmission request signals correspond to the request signal which is transmitted from the transmitter, while the response signal corresponds to the response signal which is transmitted from the portable device 1.

However, even when the code differing among transmitters as stated above is not utilized, the specified transmitter whose request signal has been responded to by the response signal of the portable device 1 can be grasped by, for example, shifting timings at which the respective transmitters transmit request signals. Besides, in the above communication procedure, it is also allowed to omit the transmission of the first transmission request signal from the vehicle-side unit and the corresponding transmission of the second ACK signal from the portable device 1.

Upon receiving the response signal which contains the ID code, from the portable device 1 in accordance with the above communication procedure, the main control ECU 4 determines whether the ID code contained in the response signal satisfies the predetermined relation, such as the agreement thereof with the registered ID code. Besides, when the predetermined relation is satisfied, the collation of the ID code is discriminated as "OK", and when not, the collation of the ID code is discriminated as "NG".

Subsequently, there will be described processing for lowering the reception sensitivity of the receiver 1a of the portable device 1. The main control ECU 4 being setting signal transmission means causes the rear transmitter 2g to selectively transmit an activation request signal A (first sensitivity setting signal) or an activation request signal B (second sensitivity setting signal) as an activation request signal. Of them, the activation request signal A is a signal which is transmitted when the luggage compartment door 15 is in its closed state, and the activation request signal B is a signal which is transmitted when the luggage compartment door 15 is in its open state. Besides, the main control ECU 4 causes the transmitters 2a-2f to transmit only the activation request signals A.

On the other hand, on the side of the portable device 1, the reception sensitivity of the receiver 1a is adjusted in correspondence with the sort of the received activation request signal. The portable ECU 1c being reception sensitivity adjustment means adjusts the reception sensitivity of the receiver 1a to a first reception sensitivity in a case where the activation request signal A has been received by this receiver 1a, and it sets the reception sensitivity at a second reception sensitivity which is lower than the first reception sensitivity, in a case where the activation request signal B has been received. In order to adjust the reception sensitivity to the lower sensitivity, the gain of the amplifier of a reception signal in the receiver 1a may be made smaller by way of example. Of course, the reception sensitivity may well be lowered by any other method.

Here, the first reception sensitivity is set at a level at which the portable device 1 can receive the request signal when it is within the communication area set by any of the transmitters 2a-2g, while the second reception sensitivity is set at a level at which, in the mutual communications of the portable device 1 with the rear transmitter 2g, the portable device 1 can receive the request signal from the rear transmitter 2g only when it lies inside the luggage compartment.

Figure 8:
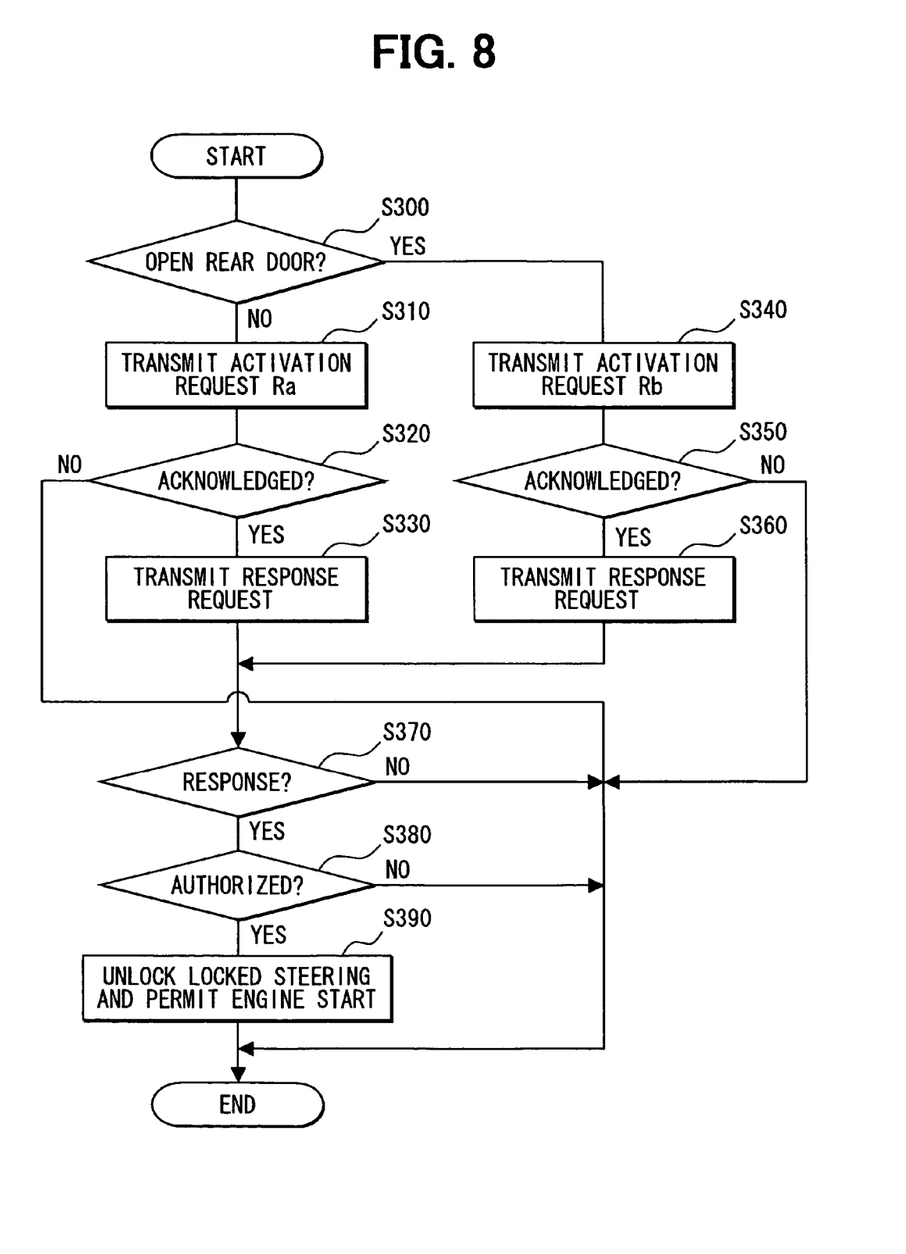
FIG. 8 is a flow chart showing the processing of a vehicle-side unit in a third embodiment.

As shown in FIG. 8, the main control ECU 4 discriminates the open/closed state of the luggage compartment door 15 on the basis of a detection signal from a door courtesy lamp switch 15a (step S300). Subject to the determination that the luggage compartment door 15 is in the closed state ("No" at step S300), the activation request signal A is transmitted from the rear transmitter 2g (step S310). When the first ACK signal has been received by the receiver 3 in response to the activation request signal A ("Yes" at step S320), the first and second transmission request signals are transmitted from the rear transmitter 2g (step S330). Subsequently, in a case where the response signal has been received from the portable device 1 in response to the first and second transmission request signals ("Yes" at step S370), the ID code contained in the response signal is collated with the registered ID code. If the collation is "OK" ("Yes" at step S380), the release of the steering lock and the start of the engine are permitted (step S390).

On the other hand, subject to the determination that the luggage compartment door is in the open state ("Yes" at step S300), the activation request signal B is transmitted from the rear transmitter 2g (step S340). When the first ACK signal has been received by the receiver 3 in response to the activation request signal B ("Yes" at step S350), the first and second transmission request signals are transmitted from the rear transmitter 2g (step S360). Subsequently, in a case where the response signal has been received from the portable device 1 in response to the first and second transmission request signals ("Yes" at step S370), the ID code contained in the response signal is collated with the registered ID code. If the collation is "OK" ("Yes" at step S380), the release of the steering lock and the start of the engine are permitted (step S390).

Besides, in a case where the first ACK signal responsive to the activation request signal A or B has not been received ("No" at step S320), the response signal responsive to the first and second transmission request signals has not been received ("No" at step S370), or in a case where the collation between the ID code and the registered ID code has been "NG" ("No" at step S380), the processing is executed again without permitting either of the release of the steering lock and the start of the engine.

Figure 9:
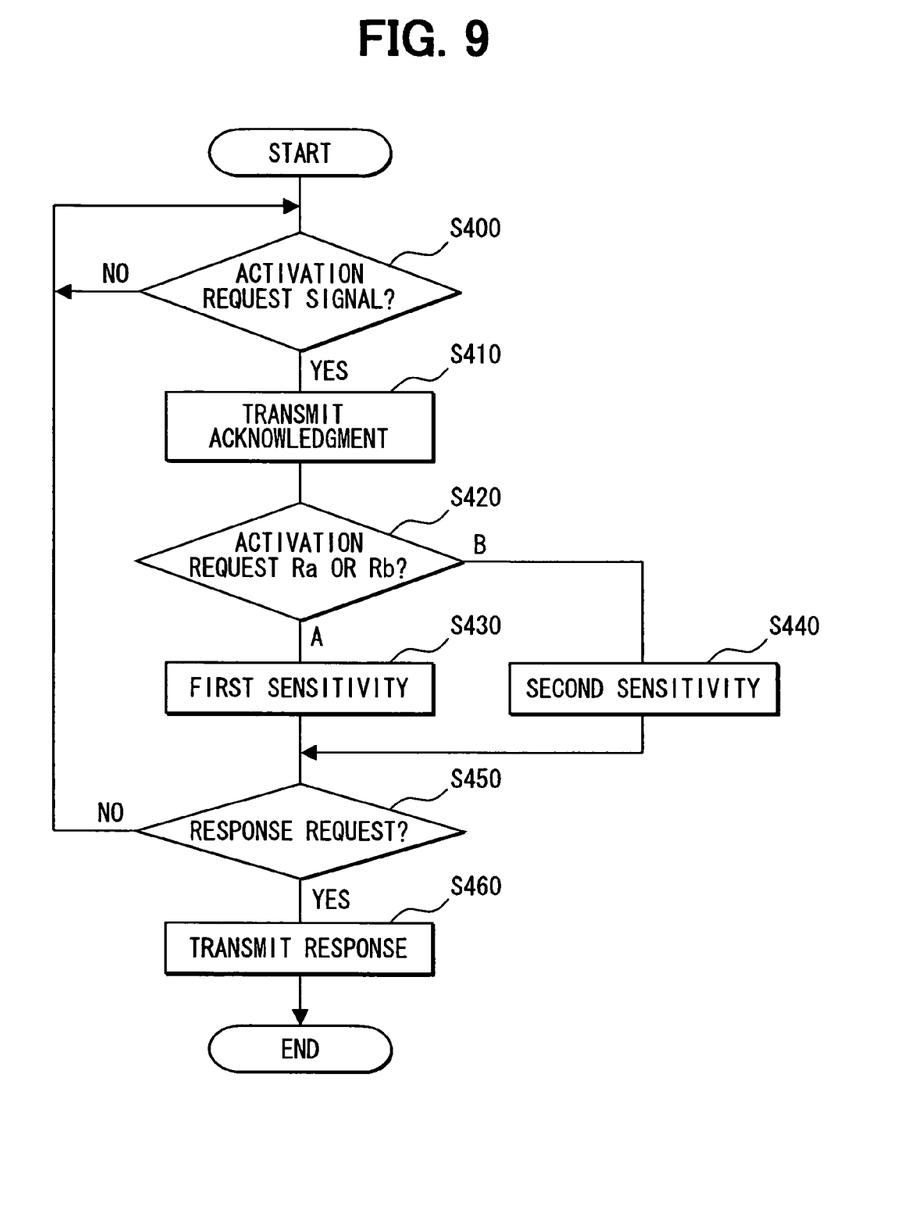
FIG. 9 is a flow chart showing the processing of a portable device in the third embodiment.

Processing shown in FIG. 9 is executed in the portable device 1. First, the portable ECU 1c determines whether the activation request signal has been received by the receiver 1a (step S400). Before the reception of the activation request signal has been determined, the portable device 1 is in a state (sleep state) where only the reception of the activation request signal and a function necessary for the determination of the reception are executed, and where the other functions are stopped. Subject to the determination that the activation request signal has been received ("Yes" at step S400), the first ACK signal is transmitted from the transmitter 1b (step S410). Besides, which of the signal A and the signal B the received activation request signal has been is determined (step S420).

When the activation request signal has been determined to be the signal A, by the determination processing ("A" at step S420), the reception sensitivity of the receiver 1a is set at the first reception sensitivity (step S430). On the other hand, in a case where the received activation request signal has been determined to be the signal B ("B" at step S420), the reception sensitivity of the receiver 1a is set at the second reception sensitivity (step S440).

In addition, whether the first and second transmission request signals have been received at the set reception sensitivity is determined (step S450). When the first and second transmission request signals have been received ("Yes" at step S450), the response signal is transmitted from the transmitter 1b (step S460), and when not ("No" at step S450), the processing is executed again.

Accordingly, in performing the mutual communications with the rear transmitter 2g, the portable device 1 adjusts the reception sensitivity to the first reception sensitivity when the luggage compartment door 15 is in the closed state. It adjusts the reception sensitivity to the second reception sensitivity lower than the first reception sensitivity, when the luggage compartment door 15 is in the open state. Thus, the communication area between the rear transmitter 2g and the portable device 1 is confined within the luggage compartment without being expanded outside the vehicle, as shown in FIG. 4.

Other Embodiments

The present invention is not restricted to the embodiments explained in the above description and illustrated in the drawings, but it can be performed in various alterations.

The communication area may well be adjusted by simultaneously lowering at least two of the transmission output of the transmitter 1b included in the portable device 1, the reception sensitivity of the receiver 1a, and the transmission output of the rear transmitter 2g.

What is claimed is:

1. A vehicle device control system comprising a vehicle-side unit included in a vehicle and a portable device for performing mutual communications, in which the portable device returns a response signal in response to a request signal transmitted from the vehicle-side unit in at least a communication area which includes a luggage compartment of the vehicle so as to control an operation of a vehicle device on the basis of a result of the communications, wherein the vehicle-side unit includes:
a transmitter which selectively transmits, as the request signal, a first request signal and a second request signal;
a receiver which receives the response signal;
determination means for determining an open/closed state of a luggage compartment door; and
instruction means for instructing the transmitter to transmit the first request signal when the determination means determines that the luggage compartment door is in the closed state, and for instructing the transmitter to transmit the second request signal when the determination means determines that the luggage compartment door is in the open state; and
wherein the portable device includes:
a receiver which is capable of receiving the first and second request signals;
a transmitter which transmits the response signal; and
output adjustment means for adjusting a transmission output of the response signal which is to be transmitted from the transmitter so as to become lower than when the first request signal has been received by the receiver, when the second request signal has been received.

2. A vehicle device control system comprising a vehicle-side unit included in a vehicle and a portable device for performing mutual communications, in which the portable device returns a response signal in response to a request signal transmitted from the vehicle-side unit in at least a communication area which includes a luggage compartment of the vehicle so as to control an operation of a vehicle device on the basis of a result of the communications, wherein the vehicle-side unit includes:
a transmitter which transmits the request signal;
a receiver which receives the response signal;
determination means for determining an open/closed state of a luggage compartment door; and
output adjustment means for adjusting a transmission output of the request signal which is to be transmitted from the transmitter, so as to become lower than when the luggage compartment door is in the closed state, when the determination means determines that the luggage compartment door is in the open state.

3. A vehicle device control system comprising a vehicle-side unit included in a vehicle and a portable device for performing mutual communications in which the portable device returns a response signal in response to a request signal transmitted from the vehicle-side unit in at least a communication area which includes a luggage compartment of the vehicle so as to control an operation of a vehicle device on the basis of a result of the communications, wherein the vehicle-side unit includes:
a transmitter which transmits the request signal;
a receiver which receives the response signal;
determination means for determining an open/closed state of a luggage compartment door; and
setting signal transmission means for causing the transmitter to transmit a first sensitivity setting signal to the portable device when the determination means determines the luggage compartment door is in the closed state, and for causing the transmitter to transmit a second sensitivity setting signal, when it has been determined that the luggage compartment door is in the open state; and
wherein the portable device comprises:

a receiver which is capable of receiving the request signal, and the first and second sensitivity setting signals;
a transmitter which transmits the response signal; and
reception sensitivity adjustment means for adjusting a reception sensitivity of the request signal in the receiver so as to become lower than when the first sensitivity setting signal has been received by the receiver, when the second sensitivity setting signal has been received.

4. A vehicle-side unit for use in a vehicle device control system, wherein mutual communications in which a portable device returns a response signal in response to a request signal are performed in at least a communication area which includes a luggage compartment of a vehicle, so as to control an operation of a vehicle device on the basis of a result of the communications, the vehicle-side unit comprising:
a transmitter which selectively transmits, as the request signal, a first request signal for causing the portable device to transmit the response signal at a first transmission output and a second request signal for causing the portable device to transmit the response signal at a second transmission output lower than the first transmission output;
a receiver which receives the response signal;
determination means for determining an open/closed state of a luggage compartment door; and
instruction means for instructing the transmitter to transmit the first request signal, when the determination means determines that the luggage compartment door is in the closed state, and for instructing the transmitter to transmit the second request signal, when the determination means determines that the luggage compartment door is in the open state.

5. A vehicle-side unit for use in a vehicle device control system, wherein mutual communications in which a portable device returns a response signal in response to a request signal are performed in at least a communication area which includes a luggage compartment of a vehicle, so as to control an operation of a vehicle device on the basis of a result of the communications, the vehicle-side unit comprising:
a transmitter which transmits the request signal info the luggage compartment;
a receiver which receives the response signal;
determination means for determining an open/closed state of a luggage compartment door; and
output adjustment means for adjusting a transmission output of the request signal which is to be transmitted from the transmitter so as to become lower than when the luggage compartment door is in the closed state, when it has been determined by the determination means that the luggage compartment door is in the open state.

6. A vehicle-side unit for use in a vehicle device control system, wherein mutual communications in which a portable device returns a response signal in response to a request signal are performed in at least a communication area which includes a luggage compartment of a vehicle so as to control an operation of a vehicle device on the basis of a result of the communications, the vehicle-side unit comprising:
a transmitter which transmits the request signal;
a receiver which receives the response signal;
determination means for determining an open/closed state of a luggage compartment door; and
setting signal transmission means for causing the transmitter to transmit a first sensitivity setting signal which causes the portable device to set a reception sensitivity of the request signal at a first reception sensitivity, when the determination means determines that the luggage compartment door is in the closed state, and for causing the transmitter to transmit a second sensitivity setting signal which causes the portable device to set the reception sensitivity at a second reception sensitivity lower than the first reception sensitivity, when it has been determined that the luggage compartment door is in the open state.

7. A portable device for performing mutual communications with a vehicle-side unit in a communication area which includes a luggage compartment of a vehicle, the portable device comprising:
    a receiver which receives a first request signal that is transmitted from the vehicle-side unit when a luggage compartment door of the vehicle is in a closed state, and a second request signal that is transmitted when the luggage compartment door is in an open state;
    a transmitter which transmits a response signal to the vehicle-side unit in response to the first and second request signals; and
    output adjustment means for adjusting a transmission output of the response signal which is to be transmitted from the transmitter so as to become lower than when the first request signal has been received by the receiver, when the second request signal has been received.

8. A portable device for performing mutual communications with a vehicle-side unit in a communication area which includes a luggage compartment of a vehicle, the portable device comprising:
    a receiver which is capable of receiving a request signal that is transmitted from the vehicle-side unit, and a first sensitivity setting signal and a second sensitivity setting signal that are similarly transmitted from the vehicle-side unit, the first sensitivity setting signal being transmitted when a luggage compartment door of the vehicle is in a closed state, the second sensitivity setting signal being transmitted when the luggage compartment door is in an open state;
    a transmitter which transmits a response signal in response to the request signal; and
    reception sensitivity adjustment means for adjusting a reception sensitivity of the request signal in the receiver so as to become lower than when the first sensitivity setting signal has been received by the receiver, when the second sensitivity setting signal has been received.

\* \* \* \* \*